(12) United States Patent
Hoffmann et al.

(10) Patent No.: US 12,729,780 B2
(45) Date of Patent: Sep. 8, 2026

(54) SOLENOID VALVE WITH IMPROVED DAMPING AND METHOD FOR PRODUCING SAME

(71) Applicant: KNORR-BREMSE SYSTEME FUER NUTZFAHRZEUGE GMBH, Munich (DE)

(72) Inventors: Christoph Hoffmann, Gaeufelden (DE); Friedbert Roether, Cleebronn (DE); René Jonkmann, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 18/859,021

(22) PCT Filed: Mar. 31, 2023

(86) PCT No.: PCT/EP2023/058523
§ 371 (c)(1),
(2) Date: Oct. 22, 2024

(87) PCT Pub. No.: WO2023/208519
PCT Pub. Date: Nov. 2, 2023

(65) Prior Publication Data

US 2025/0277544 A1 Sep. 4, 2025

(30) Foreign Application Priority Data

Apr. 29, 2022 (DE) ..................... 10 2022 110 448.6

(51) Int. Cl.
*F16K 47/00* (2006.01)
*F16K 11/044* (2006.01)
*F16K 31/06* (2006.01)

(52) U.S. Cl.
CPC .......... *F16K 47/012* (2021.08); *F16K 11/044* (2013.01); *F16K 31/0606* (2013.01);
(Continued)

(58) Field of Classification Search
CPC ............. F16K 2200/301; F16K 11/044; F16K 31/0627; F16K 31/0606; F16K 47/012; F16K 47/011
See application file for complete search history.

(56) References Cited

U.S. PATENT DOCUMENTS 2,075,769 A * 3/1937 Mccormack ............. F16J 15/34 277/379
2020/0018417 A1 1/2020 Ho
2025/0264164 A1* 8/2025 Roether .............. F16K 31/0675

FOREIGN PATENT DOCUMENTS

DE 3314722 C1 6/1984
DE 102009030579 A1 12/2010
(Continued)

OTHER PUBLICATIONS

International Search Report for PCT/EP2023/058523, Issued Jun. 21, 2023.

*Primary Examiner* — Atif H Chaudry
(74) *Attorney, Agent, or Firm* — NORTON ROSE FULBRIGHT US LLP

(57) ABSTRACT

A solenoid valve including a first connection, a second connection, an armature and a coil for moving the armature. The solenoid valve comprises: a first closure part which is coupled to the armature and opens or closes the first connection as a result of a movement of the armature; a second closure part which is coupled to the armature and opens or closes the second connection as a result of the movement of the armature; and a damping spring which is arranged between the first closure part and the second closure part and
(Continued)

is configured to dampen the closing process of the first connection and/or the second connection.

13 Claims, 2 Drawing Sheets

(52) U.S. Cl.
CPC ........ *F16K 31/0627* (2013.01); *F16K 47/011* (2021.08); *F16K 2200/301* (2021.08)

(56) References Cited

FOREIGN PATENT DOCUMENTS

| | | | | |
|---|---|---|---|---|
| EP | 2256389 A1 * | 12/2010 | ......... | F16K 31/0606 |
| JP | 2011233790 A | 11/2011 | | |

* cited by examiner

SOLENOID VALVE WITH IMPROVED DAMPING AND METHOD FOR PRODUCING SAME

FIELD OF THE INVENTION

The present invention relates to a solenoid valve having improved damping and a method for the production thereof and in particular to a 2/3-way valve with dual damping.

BACKGROUND INFORMATION

Solenoid valves are used, for example, as 2/3-way valves for controlling pressure in anti-lock braking systems (ABS) or for traction control systems (TCS) in utility vehicles or buses. These solenoid valves are subjected to an intensive loading during operation and should reliably function over many activations.

As a result of the high loading over time, however, conventional solenoid valves have considerable wear so that a reliable switching (open and/or closing) is no longer possible or is only possible to an inadequate degree. In particular, the sudden switching operations and the high forces which occur in this instance and which inter alia are caused by pressure differences often lead to mechanical wear on the valve seats and/or the closure portions. This wear can be further increased as a result of air guiding, that is to say, as a result of the redirection of the air flows within the valve. With conventional valves, it has been found that the worn components can withstand the strong air flows in the long term only in an inadequate manner.

There is therefore a requirement for alternative constructions for solenoid valves which, on the one hand, enable a simple production and, on the other hand, can ensure a reliable operating method during the entire service life.

SUMMARY OF THE INVENTION

At least some of the above-mentioned problems are solved with a solenoid valve according to the description herein and a production method according to the description herein. The further descriptions define other advantageous embodiments of the aspects of subject-matter of the main descriptions herein.

The present invention relates to a solenoid valve having a first connection, a second connection, an armature and a coil for moving the armature. The solenoid valve further comprises a first closure portion, a second closure portion and a damping spring. The first closure portion couples to the armature and opens or closes the first connection in response to a movement of the armature. The second closure portion couples to the armature and closes or opens the second connection in response to a movement of the armature. The damping spring is arranged between the first closure portion and the second closure portion and is configured to cushion or damp the closure of the first connection and/or the second connection.

The first connection portion and the second connection portion may be in the form of round sealing member(s) which reliably seal corresponding valve seats. They may be configured in a flat or conically tapering manner in order to achieve good sealing. The movement direction of the armature defines an axial direction.

Optionally, there is arranged between the first closure portion and the second closure portion only one damping spring which presses the first closure portion and the second closure portion away from each other. They may consequently be under pretensioning.

The first closure portion may further be structurally identical to the second closure portion. This affords the advantage that only one type of closure portion needs to be produced. After the insertion, both closure portions are rotated only through 180° relative to each other. A simple and cost-effective production is thereby enabled.

Optionally, the solenoid valve comprises a third connection and a chamber in which the armature together with the first and second closure portions are linearly movable. The first, second and third connections may provide a connection in the chamber (for example, via external connection portions). In an energized state of the coil, the first closure portion may close the second connection and the second closure portion may produce a fluid connection via the chamber between the second connection and the third connection. In a non-energized state of the coil, the second closure portion may close the second connection and the first closure portion may produce a fluid connection via the chamber between the first connection and the third connection. In this manner, the solenoid valve becomes a 3/2-way valve.

Optionally, the armature extends cylindrically around the first closure portion and around the second closure portion and comprises a portion which protrudes axially over the first closure portion. Furthermore, the armature may have a longitudinally extending side channel (for example, a groove). The armature may then have at least two through-openings between an inner region of the armature and the side channel, of which (at least) a first through-opening is formed in the protruding portion and (at least) a second through-opening is formed in a region of the armature which is located axially between the first closure portion and the second closure portion in order to provide a pressure compensation between the inner region and an outer region (for example, the third connection) of the cylindrical armature. Optionally a plurality of first through-openings and/or a plurality of second through-openings may also be formed in order to better distribute the air flow.

Optionally, the at least two through-openings are in the form of structurally identical holes. The term "structurally identical" may again mean that they can be produced with the same tool (for example, drill) and therefore—with the exception of the position-do not differ from each other. Alternatively or additionally to the through-openings, the armature may also have slots or incisions through which the airflow can pass.

Optionally, the first closure portion and/or the second closure portion comprise in each case a head/shoulder region for closing the associated first or second connection. The armature may have a projection which protrudes radially into the inner space and/or, at an opposing end, an annular recess having a stop element. The projection may be configured to form a stop for the head/shoulder region of the first closure portion. After the insertion of the first closure portion, the damping spring and the second closure portion, the recess can fix the second closure portion in the axial direction via the stop element.

Optionally, the stop element is a disk which can be fixed inside the recess by an edge compression of the armature. However, it does not have to be a continuous disk. It is sufficient for an axial stop to be formed for the second closure portion. However, it should not be completely fixed.

Exemplary embodiments also relate to a method for producing one of the solenoid valves which are described above and which thus have at least a first connection, a second connection, an armature having a cylindrical inner space and a coil for moving the armature. The method involves:

inserting a first closure portion in the inner space of the armature;

inserting a damping spring in the inner space of the armature; and inserting a second closure portion in the inner space of the armature, wherein the first closure portion and the second closure portion are configured in order, when the armature is moved, to alternately open or close the first connection or the second connection, whilst the damping spring provides a damping when the first connection and/or the second connection is/are closed.

Optionally, the method further comprises a formation of a stop for the second closure portion by an edge compression of the armature. The first closure portion, the second closure portion and the damping spring which is arranged therebetween are thereby fixed inside the cylindrical hollow space of the armature with respect to their maximum spacing.

Of course, all the features of the solenoid valve described above can be formed by additional optional method steps. Furthermore, it is self-evident that the sequence in which the steps are mentioned is not necessarily a sequence in which the method steps are carried out. The steps may also be carried out in another sequence or only some of the method steps are carried out.

Exemplary embodiments of the present invention overcome the problems mentioned in the introduction by (only) one spring which damps the stop of both closure portions on the valve seats. This is, for example, possible by the closure of both connections being carried out at opposing sides, which can be damped by the single pressure spring.

Exemplary embodiments afford the advantage that a dual damping significantly increases the service life of the solenoid valve. Less damage occurs and the opening and closing are carried out with a high level of precision. The solenoid valves are therefore suitable for applications which require a high number of switching operations, as required, for example, with ABS solenoid valves.

Another advantage of exemplary embodiments is that both closure portions may have an identical configuration and can consequently be produced in an exchangeable manner. The production is thereby significantly simplified and made less expensive. A cost saving is further achieved in that fewer components are required as a result of the dual damping.

The same applies to the formation of the through-openings which may be formed by identical holes since both the through-hole in the central region between the two closure portions and in the upper end region can be produced in the same working step using the same tool. The outer groove along the armature can according to exemplary embodiments already be present in the input material (rod material) which also shortens the production process and the production duration.

The exemplary embodiments of the present invention will be better understood from the following detailed description and the appended drawings of the different exemplary embodiments which are, however, not intended to be understood in such a manner that they limit the disclosure to the specific embodiments but instead are used only for explanation and understanding.

DETAILED DESCRIPTION

Figure 1:
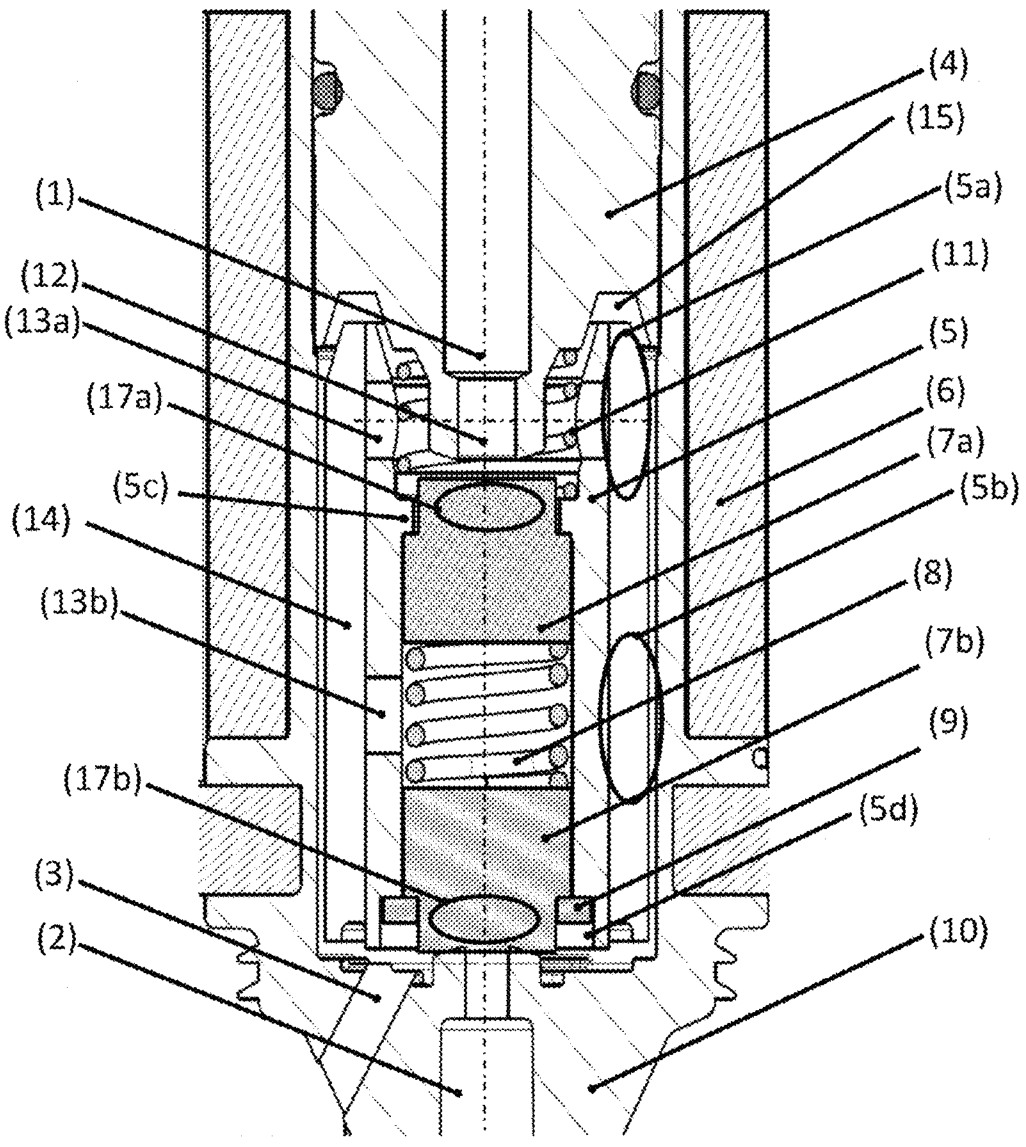
FIG. 1 shows a solenoid valve according to an exemplary embodiment of the present invention.

FIG. 1 shows a solenoid valve with improved damping according to an exemplary embodiment of the present invention. The valve shown is a 3/2-way valve which can selectively connect three connections to each other by two switching positions. To this end, the solenoid valve comprises a first connection 1, a second connection 2, a third connection 3, an armature 5, a coil 6, a first and a second closure portion 7*a*, 7*b* and a damping spring 8. The coil 6 serves to move the armature 5 (by magnetic forces). The first closure portion 7*a* couples to the armature 5 and opens or closes the first connection 1 when the armature 5 is moved by the coil 6. The second closure portion 7*b* also couples to the armature 5 and opens or closes the second connection 2 when the coil 6 moves the armature 5. The damping spring 8 is arranged between the first closure portion 7*a* and the second closure portion 7*b*. When the first connection 1 is closed and/or when the second connection 2 is closed, the damping spring 8 cushions the shock (or impact) on the corresponding valve seat. It consequently improves the damping and protects the closure portions 7*a*, 7*b* or the valve seats at the connections 1, 2.

The coil 6 may, for example, be accommodated in a valve body housing 10 and may extend cylindrically around a core 4 and the armature 5. The core 4 may, for example, be securely arranged inside the coil 6 and provide as a through-opening the first connection 1. The armature 5 can be displaced in an axial direction (vertically in FIG. 1), wherein between the core 4 and the armature 5 there is provided a pressure spring 11 which produces a pretensioning. The armature 5 may, for example, have a protruding portion 5*a* which protrudes axially over the first closure portion 7*a* and defines a cylindrical inner region in which the pressure spring 11 is guided and which receives a valve seat 12 of the first connection 1.

The first and the second closure portions 7*a*, 7*b* may move relative to the armature 5 by the damping spring 8 being compressed. However, this movement is limited axially in both directions by a stop. To this end, the first and the second closure portions 7*a*, 7*b* each comprise a narrowed region 17*a*, 17*b* which forms a shoulder/head region, wherein the head portion serves to close the associated first or second opening 1, 2 and the shoulder acts as a stop.

Furthermore, the armature 5 comprises a projection 5*c* which protrudes radially into the inner space and which forms the stop for the shoulder portion 17*a* of the first closure portion 7*a*. The pressure spring 11 may also engage on this inner projection 5*c* and press the armature 5 away from the core 4. At an opposing end, in the armature 5 an annular recess 5*d* is formed. The annular recess 5*d* is, together with the head/shoulder region 17*b* of the second closure portion 7*b*, configured in such a manner that an exemplary disk 9 which is, for example, fixed in a simple manner by a compression of the armature 5 can be used at that location. Both closure portions 7*a*, 7*b* are then fixed in the armature 5 by an axial stop.

In the non-energized state of the coil 6, the pressure spring 11 pushes the armature 5 away from the core 4. The first closure portion 7*a* thereby opens the first connection 1 since the first connection portion 7*a* is also moved by the stop 5*c*. At the same time, the pretensioning force of the pressure spring 11 is sufficient to move the armature 5 until the armature 5 closes the opposing second connection 2 by the second closure portion 7*b*. The placement of the second closure portion 7*b* on the second connection 2 is in this instance damped by the damping spring 8.

When energy is applied to the coil 6, and consequently a magnetic field is produced, the armature 5 is pulled counter to the resilient tension of the pressure spring 11 magnetically in the direction toward the core 4 until the first closure portion 7*a* closes the first connection 1. When energy is applied to the coil, the armature 5 is pulled magnetically into the coil in the direction toward the connection 1. In this instance, the stop transmits as a result of the disk 9 the force from the armature 5 to the second closure portion 7*b* which via the damping spring 8 transmits the force to the first closure portion 7*a*. The pressing force when the first connection 1 is closed is consequently limited to the resilient force of the damping spring 8 and consequently protects the solenoid valve.

As a result of this movement, either the second connection 2 or the first connection 1 is opened or closed. When the second connection 2 is open (energized state), there is a fluid connection between the third connection 3 and the second connection 2. The third connection 3 may in addition to the second connection 2 be formed in the valve body 10 in a base portion. No further precautions for air guiding between the second and third connections 2, 3 are then required.

FIG. 1 shows only the switching position with an open first connection 1. In order to guide the air flow from the first connection 1 into the inner space of the valve housing 10, the armature 5 has at least two through-openings 13 and at least one side channel 14 (for example, in the form of a groove). The at least two through-openings 13 connect an inner region of the armature 5 and the side channel 14 and provide a fluid connection between the first connection 1 and the third connection 3. For example, at least one first through-opening 13*a* is formed in the protruding portion 5*a* and at least one second through-opening 13*b* is formed in a region 5*b* of the armature 5 which is located axially between the first closure portion 7*a* and the second closure portion 7*b*. The at least one second through-opening 13*b* provides a pressure compensation between the inner region of the armature 5 and the third connection 3. The second through-opening(s) 13*a* are located axially at the height of the damping spring 8 and, as a result of the pressure compensation, reduce the wear on the first closure portion 7*a* and the second closure portion 7*b*.

It is self-evident that a plurality of through-openings 13 and/or a plurality of side channels may be provided in order to distribute the air flows as a result of the considerable pressure relationships in the most uniform manner possible over the inner space. The second connection 2 and the third connection 3 may be in the form of through-openings in the valve body housing 10.

Figure 2:
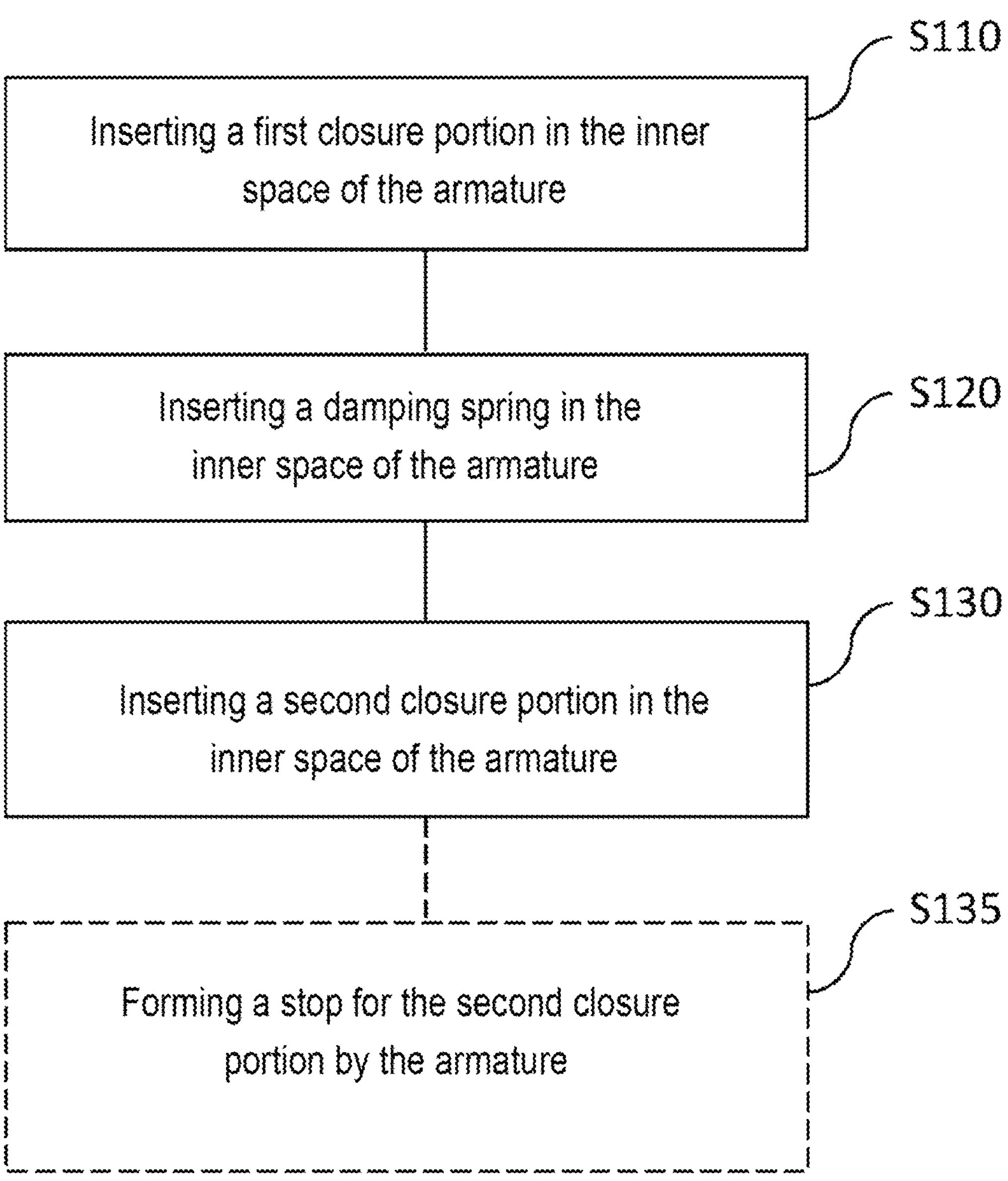
FIG. 2 shows a schematic flow diagram for a production method for a solenoid valve from FIG. 1.

FIG. 2 schematically shows a flow diagram for a method for producing one of the solenoid valves described above. The method comprises:

- inserting S110 a first closure portion 7*a* in the inner space of the armature 5;
- inserting S120 a damping spring 8 in the inner space of the armature 5; and
- inserting S130 a second closure portion 7*b* in the inner space of the armature 5.

The first closure portion 7*a* and the second closure portion 7*b* are configured during a movement of the armature 5 to alternately open or close the first connection 1 or the second connection 2, whilst the damping spring 8 provides a damping when the first connection 1 and/or the second connection 2 is/are closed.

Optionally, the method involves as an additional method step forming S135 a stop for the second closure portion 7*b* in order to ensure a fixing of the first closure portion 7*a*, the second closure portion 7*b* and damping springs 8 which are arranged therebetween inside the cylindrical hollow space of the armature 5. The formation of the stop may, for example, involve the insertion of the disk 9 and an edge compression of the armature 5. Afterwards, the disk 9 can no longer be removed from the recess without being destroyed.

Of course, all the other features of the solenoid valve as described above may be in the form of additional optional method steps during the production. Furthermore, it is self-evident that the sequence in which they are mentioned is not necessarily a sequence in which the method steps are carried out. The steps may also be carried out in another sequence or only some of the method steps are carried out.

The assembly and the media guiding can be summarized as follows:

The sequence of the assembly can therefore be carried out as follows: first, the cylindrical armature 5, in which the first closure portion 7*a* is inserted, is provided. The first closure portion 7*a* comprises a head region and a shoulder region, wherein on the shoulder region the radially inwardly protruding projections 5*c* of the armature 5 engage and provide a stop so that the first closure portion 7*a* can be moved only up to the radial projections. Afterwards, the damping spring 8 can be inserted into the cylindrical armature 5. Finally, the second closure portion 7*b* is placed on the damping spring 8. Finally, the disk 9 is inserted. Since the second closure portion 7*b* also has a shoulder portion and a head portion, the disk strikes the shoulder region and consequently provides a stop for the second closure portion 7*b*. To this end, the armature 5 comprises the circumferential recess 5*d* in which the disk 9 can be inserted. After the compression of the armature 5 at one axial end, a removal of the disk 9 and consequently the second closure portion 7*b* from the inner space of the armature 5 is no longer possible since a deformation of the axial end of the armature 5 prevents a removal of the disk 9. Subsequently, the armature can be inserted together with the core 4 in the inner space of the valve housing 10 and, after the core 9 is fixed, the solenoid valve is ready for use.

The air movement in the individual switching positions is carried out along the through-openings 13 and the outer grooves 14. To this end, along the outer cylindrical surface of the armature 5, there are provided one or more grooves 14 which enable an axial air flow in or from the third connection 3. The media guide (air) therefore passes from the first connection 1 to the third connection 3 through the core valve seat 12 and is directed through the transverse hole 13 in the armature 5. From the transverse hole 13 in the armature 5, the air guiding continues via the outer grooves mentioned to the third connection 3.

An advantage of this air guiding is that the outer grooves 14 of the armature 5 may already be provided in the input material and would not have to be produced separately. This may, for example, thus be produced before the production of the armature 5 by a turning process. Process time and consequently also costs are thereby saved. The transverse hole 13 in the armature 5 enables the air guiding both from the inner side to the outer side and from the outer side to the inner side. Furthermore, the transverse holes 13 which are used to guide air between the first connection 1 and the third connection 3 may be structurally identical to the transverse hole 13*b* which produces a pressure compensation between the first closure portion 7*a* and the second closure portion 7*b*.

The features of the invention disclosed in the description, the claims and the Figures may be significant for the implementation of the invention both individually and in any combination.

THE LIST OF REFERENCE NUMERALS IS AS FOLLOWS

1, 2, 3 Connections
4 Core
5 Armature
5*a*,5*b*,5*s*,5*d* Portions of armature
6 Coil
7, 7*a*, 7*b* Closure portion(s)
8 Damping spring
9 Disk
10 Housing body
11 Pressure spring
12 Valve seat (core)
13,13*a*, 13*b* Through-openings
14 Side channel, groove
15 Chamber (inner space)
17*a*, 17*b* Narrowed region (shoulder/head region/portion)

The invention claimed is:

1. A solenoid valve, comprising:
a first connection and a second connection;
an armature;
a coil for moving the armature;
a first closure portion, which couples to the armature, and which in response to a movement of the armature opens or closes the first connection, wherein a movement direction of the armature defines an axial direction;
a second closure portion, which couples to the armature, and which in response to a movement of the armature closes or opens the second connection; and
a damping spring, which is arranged between the first closure portion and the second closure portion, and which is configured to cushion the closure of the first connection and/or the second connection;
wherein:
the first and the second closure portion each have a head/shoulder region for closing the associated first or second connection, and
the armature has a projection which protrudes radially into the inner space and, at an opposing end, an annular recess having a stop element, wherein the projection is configured to form a stop for the head/shoulder region of the first closure portion and the recess is configured in order, after the insertion of the first closure portion, the damping spring and the second closure portion via the stop element to fix the second closure portion with respect to the axial direction.

2. The solenoid valve of claim 1, wherein only one damping spring is arranged between the first closure portion and the second closure portion, and wherein the damping spring presses the first closure portion and the second closure portion away from each other.

3. The solenoid valve of claim 1, wherein the first closure portion is structurally identical to the second closure portion.

4. The solenoid valve of claim 1, further comprising:
a third connection and a chamber in which the armature together with the first and second closure portions are linearly movable and the first, second and third connections provide a connection in the chamber;
wherein in an energized state of the coil, the first closure portion closes the first connection and the second closure portion produces a fluid connection via the chamber between the second connection and the third connection, and
wherein in a non-energized state of the coil, the second closure portion closes the second connection and the first closure portion produces a fluid connection via the chamber between the first connection and the third connection.

5. The solenoid valve of claim 1, wherein the stop element is a disk, which is fixed inside the recess by an edge compression of the armature.

6. The solenoid valve of claim 1, wherein the armature extends cylindrically around the first closure portion and around the second closure portion and has a portion which protrudes axially over the first closure portion and a longitudinally extending side channel, and
wherein the armature has at least two through-openings between an inner region of the armature and the side channel, of which a first through-opening is formed in the protruding portion and a second through-opening is formed in a region of the armature which is located axially between the first closure portion and the second closure portion to provide a pressure compensation between the inner region and an outer region of the cylindrical armature.

7. The solenoid valve of claim 6, wherein the at least two through-openings are structurally identical holes.

8. A solenoid valve, comprising:
a first connection and a second connection;
an armature;
a coil for moving the armature;
a first closure portion, which couples to the armature, and which in response to a movement of the armature opens or closes the first connection;
a second closure portion, which couples to the armature, and which in response to a movement of the armature closes or opens the second connection; and
a damping spring, which is arranged between the first closure portion and the second closure portion, and which is configured to cushion the closure of the first connection and/or the second connection;
wherein the armature extends cylindrically around the first closure portion and around the second closure portion and has a portion which protrudes axially over the first closure portion and a longitudinally extending side channel, and
wherein the armature has at least two through-openings between an inner region of the armature and the side channel, of which a first through-opening is formed in the protruding portion and a second through-opening is formed in a region of the armature which is located axially between the first closure portion and the second closure portion to provide a pressure compensation between the inner region and an outer region of the cylindrical armature.

9. The solenoid valve of claim 8, wherein the at least two through-openings are structurally identical holes.

10. A method for producing a solenoid valve, the solenoid valve having a first connection, a second connection, an armature having a cylindrical inner space and a coil for moving the armature, the method comprising:
inserting a first closure portion in the inner space of the armature;

inserting a damping spring in the inner space of the armature; and inserting a second closure portion in the inner space of the armature, wherein the first closure portion and the second closure portion are configured in order, when the armature is moved, to alternately open or close the first connection or the second connection, while the damping spring provides a damping when the first connection and/or the second connection is/are closed, wherein a movement direction of the armature defines an axial direction;

wherein:

the first and the second closure portion each have a head/shoulder region for closing the associated first or second connection, and the armature has a projection which protrudes radially into the inner space and, at an opposing end, an annular recess having a stop element, wherein the projection is configured to form a stop for the head/shoulder region of the first closure portion and the recess is configured in order, after the insertion of the first closure portion, the damping spring and the second closure portion via the stop element to fix the second closure portion with respect to the axial direction.

11. The method of claim 10, further comprising:

forming a stop for the second closure portion by an edge compression of the armature to ensure a fixing of the first closure portion, the second closure portion and damping springs which are arranged therebetween inside the cylindrical inner space of the armature.

12. The method of claim 10, wherein the armature extends cylindrically around the first closure portion and around the second closure portion and has a portion which protrudes axially over the first closure portion and a longitudinally extending side channel, and wherein the armature has at least two through-openings between an inner region of the armature and the side channel, of which a first through-opening is formed in the protruding portion and a second through-opening is formed in a region of the armature which is located axially between the first closure portion and the second closure portion to provide a pressure compensation between the inner region and an outer region of the cylindrical armature.

13. The method of claim 12, wherein the at least two through-openings are structurally identical holes.

* * * * *